United States Patent [19]

Koppel

[11] Patent Number: 4,479,322
[45] Date of Patent: Oct. 30, 1984

[54] FISHING ROD HOLDER/CARRIER

[76] Inventor: Richard A. Koppel, 110 Russell Ave., Douglassville, Pa. 19518

[21] Appl. No.: 454,348

[22] Filed: Dec. 29, 1982

[51] Int. Cl.³ .............................................. A01K 97/10
[52] U.S. Cl. ................................... 43/21.2; 248/513; 248/520; 248/528
[58] Field of Search ................ 43/21.2, 54.1; 248/461, 248/512, 513, 519, 520, 528

[56] References Cited

U.S. PATENT DOCUMENTS

| | | | |
|---|---|---|---|
| 371,777 | 10/1887 | McCabe | 43/15 |
| 2,881,996 | 4/1959 | Matchette, Jr. | 248/512 |
| 2,899,155 | 8/1959 | Rogers | 248/528 X |
| 2,973,929 | 3/1961 | Zawadzki | 248/513 |
| 3,327,978 | 6/1967 | Gates | 248/520 |
| 4,014,128 | 3/1977 | Hrdlicka | 43/21.2 |
| 4,133,131 | 1/1979 | Davy | 43/21.2 |

FOREIGN PATENT DOCUMENTS 2107161 4/1983 United Kingdom ................ 43/21.2

Primary Examiner—Nicholas P. Godici
Assistant Examiner—P. Weston Musselman, Jr.
Attorney, Agent, or Firm—Joseph Scafetta, Jr.

[57] ABSTRACT

A holder/carrier is foldable into either an open or a closed position for respectively holding or carrying a fishing rod having at least a handle portion and a staff portion. The holder/carrier comprises a base for preparing bait, extensions mounted to the base and extended forwardly thereof for preventing tip-over of the base, and upstanding members mounted near a front edge of the base. Hinges and spring locks mounted near the front edge of the base keep the upstanding members upright and maintain the holder/carrier in its open position for holding the fishing rod. Lock knobs and ball snap locks mounted near a rear edge of the base lock the upstanding members folded down and maintain the holder/carrier in its closed position for carrying the fishing rod. A handle is mounted near the rear edge of the base for transporting the holder/carrier in its closed position in a briefcase-like manner. The base is a flat, horizontally oriented, cutting board. The base and most other elements are preferably made of either lightweight plastic or wood which would cause the holder/carrier to float if it were accidentally pulled or dropped into water.

16 Claims, 5 Drawing Figures

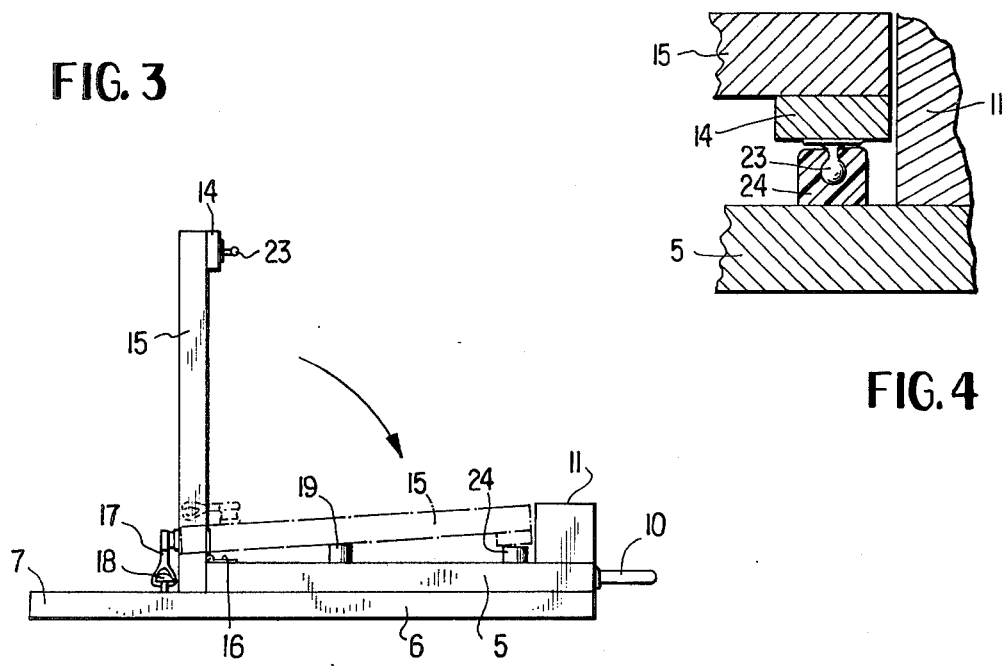
FIG. 3
FIG. 4
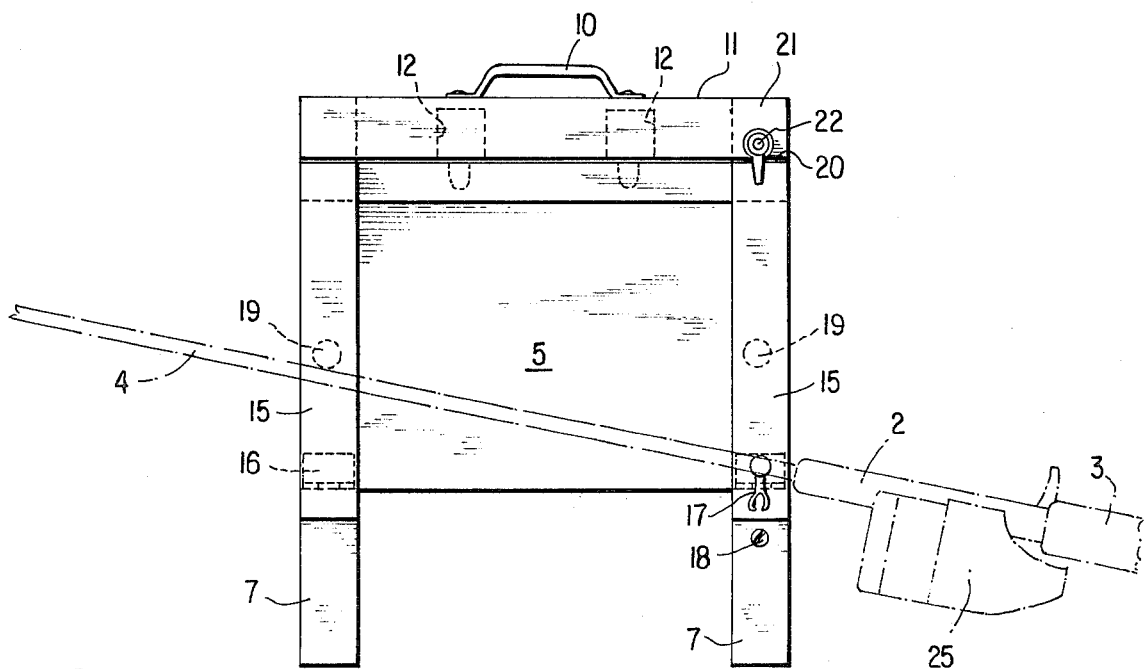
FIG. 5

4,479,322

FISHING ROD HOLDER/CARRIER

BACKGROUND OF THE INVENTION

1. Field of the Invention

This invention relates to article carriers and, in particular, to fishing rod holders.

2. Description of the Prior Art

Other types of devices for carrying and otherwise holding fishing rods and the like are well known in the prior art. Exemplary holders are shown in U.S. Pat. Nos. 371,777; 2,881,996; 2,899,155; 3,327,978; 3,701,504; and 4,014,128. However, none of these holders also function as a carrier. Nevertheless, such an apparatus which functions both as a holder and a carrier is shown in U.S. Pat. No. 4,133,131, issued to Davy on Jan. 9, 1979. But, the Davy apparatus does not function in the same manner as the present invention nor does the Davy apparatus have any of the improvements which constitute the present invention.

SUMMARY OF THE INVENTION

A fishing rod holder is foldable like a briefcase for carrying a fishing rod. When in use, the briefcase-like holder/carrier is opened to hold at least one and preferably two fishing rods. The rods are held at one end in slots cut into a rear member of the holder/carrier. Grooves are notched into the top of an upstanding member so that the staff portions of the fishing rods may be held therein when leaned against a crossbrace interconnecting two upstanding members. When the holder/carrier is opened into its holder position, the fishing rods are held at an angle from a horizontally oriented base of the holder/carrier. This base functions as a bait preparation area.

BRIEF DESCRIPTION OF THE DRAWINGS

FIG. 3 shows a side elevational view of a second embodiment of the holder/carrier being closed into its carrier position.

FIG. 4 shows a close-up cross-sectional view of a balltype snap hold used to close the second embodiment of the holder/carrier.

FIG. 5 shows a top view of the first embodiment of the holder/carrier closed into its carrier position.

DETAILED DESCRIPTION OF THE PREFERRED EMBODIMENTS

Figure 1:
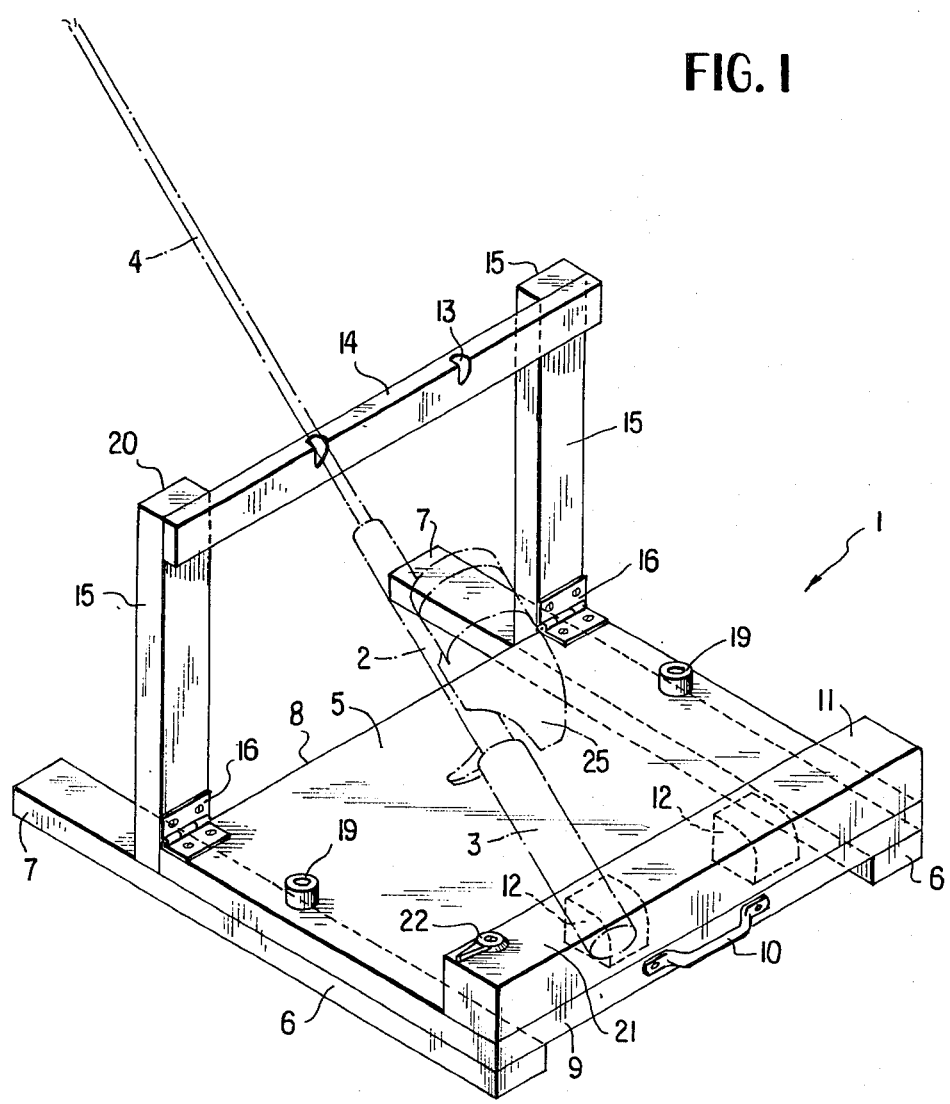
FIG. 1 shows a perspective view of a first embodiment of the holder/carrier opened into its holder position.

As best shown in FIG. 1, the holder/carrier 1 is opened into its holder position for holding a fishing rod 2 having a handle portion 3 and a staff portion 4. The holder/carrier 1 has a base 5 made of metal or plastic but preferably of nonconductive wood. If made out of nonconductive wood or plastic, the holder/carrier 1 is extremely lightweight. The base 5 functions as a preparation area, keeping bait clean and dry, when the fishing rod 3 is not in use. Preferably, the base 5 is a flat horizontally oriented, wooden cutting board. If all other elements of the present invention are also made of either lightweight plastic or wood, like base 5, the holder/carrier 1 is able to float, if accidentally pulled or dropped into the water. For extra protection against rot, the wooden elements of the holder/carrier 1 may be coated with a protective finish, such as polyurethane and the like.

Along two opposite undersides of base 5, there are secured two skid members 6 which elevate the bottom of the base 5 slightly off the ground, sand or other surface upon which the holder/carrier 1 may be placed. Thus, the fishing rod 2 is kept clean and entirely out of dirt, sand, and water. Each skid member 6 has a projection 7 which extends beyond the front edge 8 of the base 5. These projections 7 serve as anti-tipping devices whenever a large fish bites or another heavy load pulls on the fishing rod 2.

Along the back edge 9 of the base 5, there is secured a handle 10 of any conventional shape for making the holder/carrier 1 easily portable in a briefcase-like manner whenever the holder/carrier 1 is folded into its closed position.

Also, along the back edge 9 on the top surface of the base 5, there is secured a rear member 11 having at least one slot 12 and preferably two slots 12 cut therein for retaining the handle portion 3 of the fishing rod 2 in a somewhat loose but steady manner. The actual number of slots 12 may be in any amount as long as the base 5 is lengthened appropriately and the number of grooves 13 notched into and spaced along crossbrace 14 interconnecting upstanding members 15 correspond in number thereto.

Grooves 13 are open at the top so that the fishing rod 2 may be quickly removed from the holder/carrier 1 in the event that a fish bites. This quick removal of the fishing rod 2 is facilitated by the somewhat loose but steady manner in which the handle portion 3 of fishing rod 2 is retained in slot 12.

Each upstanding member 15 is held securely along its back side by a hinge 16. At least one of the upstanding members 15 is also held along its front side by a spring clip 17, best shown in FIGS. 2, 3, and 5. Although one spring clip 17 may be used for each of the upstanding members 15, it has been found that only a single spring clip 17 is necessary, as best shown in FIG. 5, in order to keep the upstanding members 15 from falling backward when the fishing rod 2 is not leaning against crossbrace 14. The reason for this arrangement is that crossbrace 14 rigidly interconnects the upstanding members 15 so that they move in unison. Spring clip 17 holds upstanding members 15 in their upright positions by securely engaging over the head of a conventional screw or other retainer 18.

Figure 2:
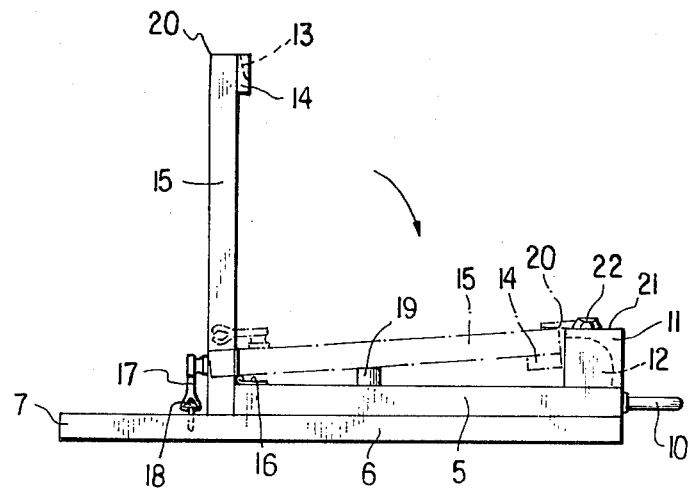
FIG. 2 shows a side elevational view of the first embodiment of the holder/carrier being closed into its carrier position.

In the first embodiment shown in FIGS. 1, 2, and 5, there is at least one stop 19, preferably made of rubber. Ideally, there is one stop 19 for each upstanding member 15. Thus, in the case of the first embodiment, there are two such stops 19 shown. Each stop 19 prevents its corresponding upstanding member 15 from slamming into the base 5 when the holder/carrier 1 is folded into its closed position. Also, each stop 19 is sized so that the top edge 20 of the front side of each upstanding member 15 is at the same height as the top edge 21 of the rear member 11 on which there is mounted a lock knob 22. The holder/carrier 1 is held in its closed position by lock knob 22 which is turned by rotating 90° so that it extends over the top edge 20 of the upstanding member 15. This securing arrangement is best shown in FIGS. 2 and 5.

Although rubber stops 19 are optional for the second embodiment shown in FIG. 3, the securing arrangement for this second embodiment differs from that of the first embodiment and is shown in the close-up view of FIG. 4. A ball element 23, preferably made of metal, is secured in a snap lock 24 made of yieldable plastic. The ball element 23 is fastened to the crossbrace 14 interconnecting upstanding members 15 while snap lock 24 is fastened to the top surface of base 5 near to the rear element 11.

The operation of the present invention is as follows. After the holder/carrier 1 is opened into the holder position shown in FIG. 1, the fisherman may prepare bait on base 5. Thereafter, the fisherman inserts the handle portion 3 of fishing rod 2 into slot 12 and the staff portion 4 of the fishing rod 2 is leaned against crossbrace 14 so that staff portion 4 is held in groove 13. Reel portion 25 of fishing rod 2 should be turned skyward so that movement of the tip of fishing rod 2 may be more easily detected when the fisherman is either sitting or standing. One advantage of this arrangement is that false movement of the rod tip caused by a slight hand motion of the fisherman is eliminated. When a fish bites on the line, the fishing rod 2 is pulled forward but the holder/carrier 1 is prevented from tipping over by extensions 7 of skid members 6. The fisherman may quickly remove the fishing rod 2 from its holding position in the holder/carrier 1 and is able to personally control the bringing in of the fish. While the fisherman is attempting to reel in the fish, upstanding members 15 remain upright because they are secured in such position by the engagement of spring clip 17 with retainer 18. A strong wind could easily blow backward upstanding members 15 with their interconnecting crossbrace 14 if at least one upstanding member 15 were not secured on its front side by the spring lock 17. Hinges 16 are not sufficient by themselves to keep upright the upstanding members 15 with their interconnecting crossbrace 14 against the force of a strong wind. Once the fish is caught, fishing rod 2 may be placed back into place on the holder/carrier 1 so that the fish may be easily removed from the end of the line by the fisherman while standing.

When the fisherman is finished for the day, he folds the upstanding members 15 with their interconnecting crossbrace 14 downward with sufficient force so that spring clip 17 disengages over retainer 18, as shown in FIGS. 2 and 3. In both embodiments, stops 19 prevent upstanding members 15 with their interconnecting crossbrace 14 from slamming into the base 5. In the first embodiment of FIG. 2, after the upstanding members 15 with their interconnecting crossbrace 14 are folded down, the fisherman rotates lock knob 22 90° so that it extends over top edge 20 of upstanding member 15. In the second embodiment of FIGS. 3 and 4, the fisherman pushes ball element 23 into yieldable plastic snap lock 24. Thus, in both embodiments, the holder/carrier 1 is in its closed carrier position, ready to be transported simply by gripping handle 10. As the first embodiment is shown in FIG. 5 and the second embodiment is shown in FIG. 4, the staff portion 4 of fishing rod 2 may be slipped into the space bounded by base 5, upstanding members 15, hinges 16 and stops 19. Although it may be readily seen that fishing rod 2 is loosely held in holder/carrier 1, there is little danger of damage to the fishing rod 2 because it is held close to the ground due to the briefcase-like arrangement of the holder/carrier 1.

The intangible benefits of the present invention are that it makes fishing more enjoyable and convenient, less boring and fatiguing than the old method of simply holding the fishing rod manually. When one or more fishing rods are being held by the present invention, the fisherman can relax, have a snack, chat with passers-by, bait up more lines, or whatever. In fact, while both fishing rods are being held at an inclined angle by the holder/carrier 1 in its use position, the fisherman can bait up both lines from a comfortable standing position without getting dirty and without needing to lay the fishing rod on the ground.

Of course, if the fisherman has only one fishing rod with him, he can share his holder/carrier with a friend because the invention may hold two rods. Furthermore, because of its open grooves and its large slots, the present invention can hold most conventional fishing rods. Finally, the present invention is inexpensive to manufacture because of its few movable parts and can be used for river bank, lake side, seashore or boat fishing.

The foregoing preferred embodiments are considered as illustrative only. Numerous other modifications and changes will readily occur to those skilled in the art of fishing and, consequently, the disclosed invention is not limited to the exact constructions and operations shown and described hereinabove.

I claim:

1. A holder/carrier, foldable into either an open or a closed position for respectively holding or carrying a fishing rod having at least a handle portion and a staff portion, comprising:
   a. a base means for preparing bait;
   b. extension means, mounted to the base means and extended forwardly thereof, for preventing tip-over of the base means;
   c. upstanding members, mounted on and near a front edge of the base means;
   d. means, mounted on said extension means and cooperating with said upstanding members, for keeping the upstanding members upright and for maintaining the holder/carrier in its open position for holding the fishing rod;
   e. means, mounted near a rear edge of the base means, for locking the upstanding members folded down fnd for maintaining the holder/carrier in its closed position for carrying the fishing rod; and
   f. a handle means, mounted near the rear edge of the base means, for transporting the holder/carrier in its closed position in a briefcase-like manner;
   said extension means include substantially parallel skid members, mounted on the underside of and extending along at least a portion of the length of the base means, for elevating the bottom of the base means slightly off the surface upon which the holder/carrier is placed so that the fishing rod is kept clear and entirely out of dirt, sand and water.

2. The holder/carrier, according to claim 1, wherein: said base means is a flat, horizontally oriented, cutting board.

3. The holder/carrier, according to claim 2, wherein: said base means is made of one of floatable, nonconductive, lightweight plastic and wood.

4. The holder/carrier, according to claim 1, further comprising:
   crossbrace means, interconnected between at least two of the upstanding members, for maintaining the fishing rod at an inclined angle from the base means.

5. The holder/carrier, according to claim 4, wherein:

said crossbrace means includes open top groove means for holding therein the staff portion of the fishing rod.

6. The holder/carrier, according to claim 1, wherein: said keeping means includes hinges mounted between the base means and the upstanding members.

7. The holder/carrier, according to claim 1, further comprising:
a rear member mounted near the rear edge of the base means.

8. The holder/carrier, according to claim 7, wherein: said rear member includes slots for holding therein the handle portion of the fishing rod, said fishing rod being of any conventional type.

9. The holder/carrier, according to claim 7, wherein: said locking means includes a lock knob means, mounted on the rear member, for holding down at least one of the upstanding members.

10. The holder/carrier, according to claim 1, wherein:
said locking means includes a ball element mounted on at least one of the upstanding members and a snap lock mounted on the base means.

11. The holder/carrier, according to claim 1, further comprising:
means, mounted on the base means, for stopping the upstanding members from slamming into the base means.

12. The holder/carrier, according to claim 11, wherein:
said staff portion of the fishing rod may be slipped into space bounded by the base means, the upstanding members, the keeping means, and the stopping means.

13. A holder/carrier, foldable into either an open or a closed position for respectively holding or carrying a fishing rod having at least a handle portion and a staff portion, comprising:
a. a base means for preparing bait;
b. extension means, mounted to the base means and extended forwardly thereof, for preventing tip-over of the base means;
c. upstanding members, mounted on and near a front edge of the base means;
d. means, mounted on said extension means and cooperating with said upstanding members, for keeping the upstanding members upright and for maintaining the holder/carrier in its open position for holding the fishing rod;
e. means, mounted near a rear edge of the base means, for locking the upstanding members folded down and for maintaining the holder/carrier in its closed position for carrying the fishing rod;
f. a handle means, mounted near the rear edge of the base means, for transporting the holder/carrier in its closed position in a briefcase-like manner; and
g. a rear member mounted near the rear edge of the base means;
said rear member includes slots for holding therein the handle portion of the fishing rod, said fishing rod being of any conventional type;
said extension means include substantially parallel skid members, mounted on the underside of and extending along at least a portion of the length of the base means, for elevating the bottom of the base means slightly off the surface upon which the holder/carrier is placed so that the fishing rod is kept clear and entirely out of dirt, sand and water;
said locking means includes a lock knob means, mounted on the rear member, for holding down at least one of the upstanding members.

14. A holder/carrier, foldable into either an open or a closed position for respectively holding or carrying a fishing rod having at least a handle portion and a staff portion, comprising:
a. a base means for preparing bait;
b. extension means, mounted to the base means and extended forwardly thereof, for preventing tip-over of the base means;
c. upstanding members, mounted on and near a front edge of the base means;
d. means, mounted on said extension means and cooperating with said upstanding members, for keeping the upstanding members upright and for maintaining the holder/carrier in its open position for holding the fishing rod; and
e. means, mounted near a rear edge of the base means, for locking the upstanding members folded down and for maintaining the holder/carrier in its closed position for carrying the fishing rod;
said extension means include substantially parallel members, mounted on the underside of and extending along at least a portion of the length of the base means, for elevating the bottom of the base means slightly off the surface upon which the holder/carrier is placed so that the fishing rod is kept clean and entirely out of dirt, sand and water;
said keeping means includes a spring lock mounted on at least one upstanding member and a retainer mounted on the extension means.

15. A holder/carrier, foldable into either an open or a closed position for respectively holding or carrying a fishing rod having at least a handle portion and a staff portion, comprising:
a. a base means for preparing bait;
b. extension means, mounted to the base means and extended forwardly thereof, for preventing tip-over of the base means;
c. upstanding members, mounted on and near a front edge of the base means;
d. means, mounted on said extension means and cooperating with said upstanding members, for keeping the upstanding members upright and for maintaining the holder/carrier in its open position for holding the fishing rod;
said keeping means includes a spring lock mounted on at least one upstanding member and a retainer mounted on the extension means;
e. means, mounted near a rear edge of the base means, for locking the upstanding members folded down and for maintaining the holder/carrier in its closed position for carrying the fishing rod; and
f. a rear member mounted near the rear edge of the base means;
said rear member includes slots for holding therein the handle portion of the fishing rod, said fishing rod being of any conventional type;
said extension means include substantially parallel skid members, mounted on the underside of and extending along at least a portion of the length of the base means, for elevating the bottom of the base means slightly off the surface upon which the holder/carrier is placed so that the fishing rod is kept clear and entirely out of dirt, sand and water;

said locking means includes a lock knob means, mounted on the rear member, for holding down at least one of the upstanding members.

16. A holder/carrier, foldable into either an open or a closed position for respectively holding or carrying a fishing rod having at least a handle portion and a staff portion, comprising:
 a. a base means for preparing bait;
 b. extension means, mounted to the base means and extended forwardly thereof, for preventing tip-over of the base means;
 said extension means include substantially parallel skid members, mounted on the underside of and extending along at least a portion of the length of the base means, for elevating the bottom of the base means slightly off the surface upon which the holder/carrier is placed so that the fishing rod is kept clear and entirely out of dirt, sand and water;
 c. upstanding members, mounted on and near a front edge of the base means;
 d. means, mounted on said extension means and cooperating with said upstanding members, for keeping the upstanding members upright and for maintaining the holder carrier in its open position for holding the fishing rod;
 e. means, mounted near a rear edge of the base means, for locking the upstanding members folded down and for maintaining the holder/carrier in its closed position for carrying the fishing rod;
 f. crossbrace means, interconnected between at least two of the upstanding members, for maintaining the fishing rod at an inclined angle from the base means;
 said crossbrace means includes open top groove means for holding therein the staff portion of the fishing rod; and
 g. a rear member mounted near the rear edge of the base means;
 said rear member includes slots for holding therein the handle portion of the fishing rod, said fishing rod being of any conventional type;
 whereby the fishing rod may be quickly removed from the holder/carrier in the event that a fish bites the bait due to the somewhat loose but steady manner in which the handle portion of the fishing rod is retained in the slot.

* * * * *